United States Patent Office 2,822,405
Patented Feb. 4, 1958

2,822,405

FREE-FLOWING, CRYSTALLINE 2,3,4,6-TETRACHLOROPHENOL COMPOSITION

John C. Vander Weele, Midland, Mich., assignor to The Dow Chemical Company, Midland, Mich., a corporation of Delaware No Drawing. Application August 13, 1956
Serial No. 603,830

4 Claims. (Cl. 260—623)

This invention concerns a free-flowing, complex-crystalline composition containing a preponderance of 2,3,4,6-tetrachlorophenol, and its method of manufacture.

The compound 2,3,4,6-tetrachlorophenol is useful for many purposes. One disadvantage incidental to the use of flaked or granular 2,3,4,6-tetrachlorophenol is that on standing it sets up or cakes. Consequently, stored or packaged quantities of such tetrachlorophenol are handled with difficulty, and require breaking up to facilitate removal and solution.

In accordance with this invention, it has now been discovered that molten mixtures containing between 70 and 82.5 percent by weight of 2,3,4,6-tetrachlorophenol and correspondingly between 30 and 17.5 percent pentachlorophenol, preferably about 80 percent 2,3,4,6-tetrachlorophenol and 20 percent pentachlorophenol, can be converted to a solid subdivided state to form a stable, complex-crystal system having the stated composition, which remains free-flowing and readily soluble even when stored or packaged for prolonged periods. It has also been discovered that such a composition, as previously described, can readily be made by chlorinating molten phenol in conventional manner, but modified in that the chlorination reaction is stopped when the molten reaction medium has a composition between 70 and 82.5 percent by weight of said tetrachlorophenol and correspondingly between 30 and 17.5 percent pentachlorophenol, as determined by any suitable analytic procedure, for example, by infra-red analysis, and solidifying and flaking or subdividing the solid mass in a conventional way. Alternatively, the products of this invention can be made by mixing a 2,3,4,6-tetrachlorophenol having less than 70 or more than 82.5 percent by weight of 2,3,4,6-tetrachlorophenol with sufficient tetrachlorophenol or pentachlorophenol, respectively, to fall within the composition range indicated, and melting, solidifying and subdividing the resulting products. This alternative is more costly and, therefore, less preferred than the process previously indicated. However, it has the advantage that process mistakes can be corrected. Mechanical mixtures of solid 2,3,4,6-tetrachlorophenol and pentachlorophenol or molten mixtures containing more than 82.5 percent of 2,3,4,6-tetrachlorophenol do not give the stable, free-flowing, complex-crystals of this invention.

The following examples represent specific embodiments of the products and process of this invention, and illustrate advantages flowing therefrom.

*Example 1*

A quantity of 3440 lbs. of phenol was loaded into a 720 gallon reactor and heated to 60–70° C. Gaseous chlorine was then admitted to the reactor by means of a sparger and the contents was chlorinated at 60–70° C. until the reaction product consisted essentially of a mixture of dichlorophenol and trichlorophenol. The chlorine was then shut off and 30 lbs. of anhydrous aluminum chloride was added as catalyst to the reactor. Chlorine was again admitted and chlorination continued at 75–85° C. until the reactor contents consisted of a mixture of 82.5±1 percent by weight of 2,3,4,6-tetrachlorophenol and 17.5±1 percent by weight of pentachlorophenol, as determined by infra-red analysis, with traces of aluminum chloride and residual dissolved hydrogen chloride. The reaction mixture was purged with air to remove traces of hydrogen chloride and was then fed to a cooled flaker drum and converted to a solid flake. The flaked product was packaged in drums. After two weeks storage at room temperature, the product was still in a free-flowing, flaked form.

*Example 2*

The purpose of this example is to show that caking results with compositions outside the scope of the invention.

A second batch of phenol was similarly chlorinated with the exception that the chlorination was stopped when the mixture had the following composition:

| | Percent by weight |
|---|---|
| 2,3,4,6-tetrachlorophenol | 84.3 |
| Pentachlorophenol | 15.0 |
| 2,4,6-trichlorophenol, aluminum chloride and hydrogen chloride | 0.7 |

The molten reaction mixture was purged of hydrogen chloride and cooled, flaked and packaged in a manner similar to that of Example 1. After three days' standing at room temperature, the flaked material had changed to a form wherein the flakes had become tightly stuck together to form a semi-solid mass which could not be removed from the package without digging.

*Example 3*

A portion of the product made in Example 2 was remelted by heating and sufficient pentachlorophenol was dissolved in it so as to bring the pentachlorophenol content of the molten mixture to 21 percent by weight. This adjusted mixture was flaked and packaged and remained as a free-flowing flaked product for at least seven weeks thereafter.

*Example 4*

The procedure of Example 1 was repeated until a molten reaction product was obtained having 70 percent by weight of 2,3,4,6-tetrachlorophenol and 29.5 percent pentachlorophenol, the balance being traces of $AlCl_3$ and 2,4,6-trichlorophenol. This product was cooled and flaked as in Example 1. After two months' storage at room temperature, the product was still in a free-flowing, flaked form.

What is claimed is:

1. A stable, free-flowing, solid, melt-derived complex-crystalline composition containing between 70 and 82.5 percent by weight of 2,3,4,6-tetrachlorophenol and correspondingly between 30 and 17.5 percent by weight of pentachlorophenol.

2. A stable, free-flowing, solid, melt-derived complex-crystalline composition containing about 80 percent by weight of 2,3,4,6-tetrachlorophenol and about 20 percent by weight of pentachlorophenol.

3. A process for preparing a stable, free-flowing, complex-crystalline composition containing between 70 and 82.5 percent by weight of 2,3,4,6-tetrachlorophenol and correspondingly between 30 and 17.5 percent by weight of pentachlorophenol, which process consists in chlorinating phenol until a molten reaction product containing between 70 and 82.5 percent by weight of 2,3,4,6-tetrachlorophenol and between 30 and 17.5 percent by weight of pentachlorophenol is obtained, and solidifying and subdividing said reaction product.

4. In a process for making a stable, free-flowing, 2,3,4,6-tetrachlorophenol composition, the improvement which consists in adjusting the proportions of a molten mixture of 2,3,4,6-tetrachlorophenol and pentachlorophenol to contain between 70 and 82.5 percent by weight of 2,3,4,6-tetrachlorophenol and correspondingly between 30 and 17.5 percent by weight of pentachlorophenol, and solidifying and subdividing said molten composition.

References Cited in the file of this patent

UNITED STATES PATENTS

| | | |
|---|---|---|
| 2,131,259 | Stoesser | Sept. 27, 1938 |
| 2,188,944 | Fox et al. | Feb. 6, 1940 |
| 2,563,815 | Bruce | Aug. 14, 1951 |